US011949937B2

(12) United States Patent
Delpuch et al.

(10) Patent No.: US 11,949,937 B2
(45) Date of Patent: *Apr. 2, 2024

(54) METHOD AND DEVICE TO CREATE INTERACTIVITY BETWEEN A MAIN DEVICE AND AT LEAST ONE SECONDARY DEVICE

(71) Applicant: OpenTV, Inc., San Francisco, CA (US)

(72) Inventors: Alain Delpuch, Paris (FR); Ludovic Pierre, Mountain View, CA (US)

(73) Assignee: OPENTV, INC., San Francisco, CA (US)

(*) Notice: Subject to any disclaimer, the term of this patent is extended or adjusted under 35 U.S.C. 154(b) by 17 days.

This patent is subject to a terminal disclaimer.

(21) Appl. No.: 17/319,719

(22) Filed: May 13, 2021

(65) Prior Publication Data
US 2021/0337258 A1 Oct. 28, 2021

Related U.S. Application Data

(63) Continuation of application No. 16/222,414, filed on Dec. 17, 2018, now Pat. No. 11,039,194, which is a
(Continued)

(30) Foreign Application Priority Data

Aug. 11, 2014 (EP) .................................... 14180459

(51) Int. Cl.
H04N 21/41 (2011.01)
H04N 21/422 (2011.01)
(Continued)

(52) U.S. Cl.
CPC ... H04N 21/4126 (2013.01); H04N 21/41265 (2020.08); H04N 21/42209 (2013.01);
(Continued)

(58) Field of Classification Search
CPC ........... H04N 21/8186; H04N 21/8173; H04N 21/4126; H04N 21/42207;
(Continued)

(56) References Cited

U.S. PATENT DOCUMENTS 5,861,881 A 1/1999 Freeman et al.
7,979,880 B2 7/2011 Hosea et al.
(Continued)

FOREIGN PATENT DOCUMENTS

EP 2 343 881 A2 7/2011
EP 2 611 208 7/2013
(Continued)

OTHER PUBLICATIONS

European Search Report issued in European Application No. 18207809.7 dated Feb. 14, 2019; 7 pages.
(Continued)

Primary Examiner — Kyu Chae
(74) Attorney, Agent, or Firm — POLSINELLI LLP

(57) ABSTRACT

A method to create interactivity between a main device and a secondary device. The method comprises receiving a main stream comprising a signal indicating the availability of the ongoing interactive experience related to the audio/video content and extracting the interactive data from the main stream, obtaining a main interactive application related to the interactive data by the main device, obtaining a secondary interactive application related to the interactive data by the secondary device, loading the main interactive application into a software module of the main device, executing the main interactive application with all or part of the interactive data, collecting by the main interactive application of the main device, result of user's interactions made on the secondary device during execution of the secondary interactive application, processing the received user's inter-
(Continued)

action by the main interactive application to produce a result, displaying the result on the screen together with the audio/video content.

20 Claims, 2 Drawing Sheets

Related U.S. Application Data continuation of application No. 14/823,690, filed on Aug. 11, 2015, now abandoned.

(51) Int. Cl.
| | |
|---|---|
| *H04N 21/4335* | (2011.01) |
| *H04N 21/436* | (2011.01) |
| *H04N 21/472* | (2011.01) |
| *H04N 21/478* | (2011.01) |
| *H04N 21/81* | (2011.01) |

(52) U.S. Cl.
CPC ... *H04N 21/4335* (2013.01); *H04N 21/43615* (2013.01); *H04N 21/8166* (2013.01); *H04N 21/8173* (2013.01); *H04N 21/8186* (2013.01); *H04N 21/472* (2013.01); *H04N 21/478* (2013.01); *H04N 21/8126* (2013.01)

(58) Field of Classification Search
CPC ....... H04N 21/42209; H04N 21/43615; H04N 21/8166; H04N 21/472; H04N 21/478
See application file for complete search history.

(56) References Cited

U.S. PATENT DOCUMENTS

| | | | |
|---|---|---|---|
| 8,359,399 B2 | 1/2013 | Landow | |
| 8,516,528 B2* | 8/2013 | Sandoval | H04N 5/06 |
| | | | 725/141 |
| 8,516,828 B2 | 8/2013 | Sandoval | |
| 8,869,222 B2 | 10/2014 | Winograd | |
| 8,954,346 B1 | 2/2015 | Walker | |
| 9,183,558 B2 | 11/2015 | Davy | |
| 11,039,194 B2 | 6/2021 | Delpuch et al. | |
| 2002/0059094 A1 | 5/2002 | Hosea et al. | |
| 2002/0124252 A1* | 9/2002 | Schaefer | H04N 21/6131 |
| | | | 348/E7.071 |
| 2002/0194620 A1 | 12/2002 | Zdepski | |
| 2003/0009574 A1 | 1/2003 | Bodin | |
| 2005/0177861 A1 | 8/2005 | Ma | |
| 2008/0288993 A1 | 11/2008 | Aghasaryan et al. | |
| 2009/0150553 A1 | 6/2009 | Collart | |
| 2010/0331082 A1 | 12/2010 | Kim | |
| 2011/0081965 A1* | 4/2011 | Klein | H04N 21/8455 |
| | | | 463/31 |
| 2011/0086631 A1 | 4/2011 | Park | |
| 2011/0197229 A1 | 8/2011 | Yassa | |
| 2012/0210348 A1* | 8/2012 | Verna | H04N 21/2368 |
| | | | 725/25 |
| 2012/0210349 A1 | 8/2012 | Campana et al. | |
| 2012/0272263 A1 | 10/2012 | Sharma et al. | |
| 2013/0007827 A1 | 1/2013 | Adam | |
| 2013/0169418 A1 | 7/2013 | Seo et al. | |
| 2013/0183021 A1 | 7/2013 | Oaman | |
| 2013/0298169 A1 | 11/2013 | Wells | |
| 2013/0347018 A1 | 12/2013 | Limp | |
| 2014/0165112 A1 | 6/2014 | Freeman | |
| 2014/0181875 A1 | 6/2014 | Zdepski | |
| 2014/0359057 A1* | 12/2014 | Hensgen | H04N 21/43079 |
| | | | 709/217 |
| 2015/0121411 A1 | 4/2015 | Ekselius | |
| 2015/0121432 A1* | 4/2015 | Pandey | H04N 21/4755 |
| | | | 725/78 |
| 2015/0215665 A1 | 7/2015 | Casagrande | |
| 2015/0245081 A1* | 8/2015 | Cook | H04N 21/26283 |
| | | | 725/81 |
| 2015/0296242 A1 | 10/2015 | Khalil | |
| 2015/0339274 A1 | 11/2015 | Pappu | |
| 2016/0044361 A1 | 2/2016 | Delpuch et al. | |

FOREIGN PATENT DOCUMENTS

| | | |
|---|---|---|
| EP | 2 660 998 A2 | 11/2013 |
| WO | WO 97/29458 | 8/1997 |
| WO | WO 02/102030 | 12/2002 |
| WO | WO 2011/053271 | 5/2011 |

OTHER PUBLICATIONS

European Search Report issued in European Application No. 14 18 0459 dated Dec. 18, 2014.
Non-Final Office Action dated Sep. 20, 2016 for U.S. Appl. No. 14/823,690; 14 pages.
Final Office Action dated Mar. 23, 2017 for U.S. Appl. No. 14/823,690; 15 pages.
Non-Final Office Action dated Jul. 26, 2017 for U.S. Appl. No. 14/823,690; 17 pages.
Final Office Action dated Nov. 17, 2017 for U.S. Appl. No. 14/823,690; 18 pages.
Non-Final Office Action dated Jun. 22, 2018 for U.S. Appl. No. 14/823,690; 16 pages.
Non-Final Office Action dated Sep. 4, 2019 for U.S. Appl. No. 16/222,414; 14 pages.
Final Office Action dated Feb. 19, 2020 for U.S. Appl. No. 16/222,414; 20 pages.
Non-Final Office Action dated Jun. 22, 2020 for U.S. Appl. No. 16/222,414; 24 pages.
Final Office Action dated Oct. 30, 2020 for U.S. Appl. No. 16/222,414; 25 pages.
Notice of Allowance dated Feb. 18, 2021 for U.S. Appl. No. 16/222,414; 10 pages.

* cited by examiner

METHOD AND DEVICE TO CREATE INTERACTIVITY BETWEEN A MAIN DEVICE AND AT LEAST ONE SECONDARY DEVICE

CROSS-REFERENCE TO RELATED APPLICATIONS

This application is a continuation of U.S. application Ser. No. 16/222,414 filed Dec. 17, 2018, which is a continuation of U.S. application Ser. No. 14/823,690 filed Aug. 11, 2015, which claims the benefit of EP Application No. 14180459.1, filed Aug. 11, 2014, all of which are incorporated herein by reference in their entirety for all purpose.

INTRODUCTION

The present invention concerns the field of television systems, in particular involving a main user device and a secondary user device interacting together.

BACKGROUND ART

A transmitted broadcast stream, containing audio/video contents, can further comprise additional data allowing an interactive experience with the content. As an example, the document WO97/29458 describes a solution in which the broadcast signal comprises data commands interacting with the locally stored user profile for presenting an appropriate personalized feedback to the viewer.

Other solutions have been proposed (US2011/0197229) in which the broadcast stream comprises a main stream and a co-cast stream, the main receiver (STB) receives the broadcast stream, and extracts the co-cast stream to be wirelessly broadcasted to a hand held wireless device. The hand held wireless device can previously receive a list of the co-cast streams received by the STB, select one and request the transmission of the selected co-cast stream by the STB.

In a case where interactivity between multiple screens is involved, WO2011/053271 describes a solution in which the main device plays the role as web server and the slave device can interact with the main device by a standard browser.

One aim of the present invention is not only providing interactivity between two devices in the reception of TV programs but to provide flexibility in the interaction between the devices.

BRIEF DESCRIPTION OF THE INVENTION

A method is proposed to create interactivity between a main reception device and at least one secondary device, said main device having an interface for transmitting signals to a display and an interface with the secondary device, the method comprising the steps of:
  receiving a main stream by the main device, said main stream comprising audio/video content and interactive data, said interactive data comprising at least a main interactive application for the main device and a pointer for obtaining at least one secondary application,
  extracting the main interactive application and the pointer from the main stream by the main device,
  loading the main interactive application into a software module of the main device, obtaining by the main device a type of the secondary device via the interface with the secondary device,
  obtaining, by the main device, a secondary interactive application using the pointer and the type of secondary device and transmitting it to the secondary device,
  loading the secondary interactive application into a software module of the secondary device,
  executing the main and executing the secondary interactive application with all or part of the interactive data,
  collecting by the main interactive application of the main device, results of a user's interactions made on the secondary device during execution of the secondary interactive application,
  processing the received user's interaction by the main interactive application to produce displayable data related to the audio/video content, and
  transmitting said displayable data together with the audio/video content to the interface between the main device and the display.

A main device in charge of generating an interactive application based on a received audio/video content and result of user's interaction received from at least one secondary device, said main device comprising first communication means to receive a main stream comprising the audio/video content and interactive data, said interactive data comprising at least a main interactive application for the main device and a pointer for obtaining at least one secondary application, the main device comprising second communication means to communicate with a secondary device, the main device being configured to:
  receive the main stream
  extract the main interactive application and the pointer from the main stream,
  load the main interactive application into a software module of the main device,
  obtain a type of the secondary device via the second communication means,
  obtain a secondary interactive application using the pointer and the type of secondary device and transmit it to the secondary device,
  execute the main interactive application with all or part of the interactive data,
  receive by the main interactive application, results of a user's interactions made on the secondary device during execution of the secondary interactive application,
  process the received user's interaction by the main interactive application to produce displayable data related to the audio/video content, and
  transmit said displayable data together with the audio/video content to an interface between the main device and a display.

One of the main aspect of this invention is the fact that the user's experience is the result of the execution of an interactive application on each device, said interactive application being obtained by the main device in order to allow the main and the secondary devices to load the interactive application and execute both of them. The execution uses interactive parameters, a first set of parameters for the main application and a second set for the secondary application. It is to be noted that in the context of the present invention, different scenarios are foreseen in order to obtain the main and the secondary interactive applications, and that these may be separate of mixed in a given implementation.

1. Via a Transmission from the Operator

A first mode of realization focuses on the extraction of the main and secondary interactive applications from the transmitted stream. "Transmitted stream" encompasses a transmission of the type one-to-many such as broadcast and multicast. These applications are then part of interactive data transmitted by an operator. The interactive data preferably contain the applications (the software to be executed on the devices) and the interactive parameters.

2. Via a Point-to-Point Connection (IP)

The main and the secondary interactive applications can be downloaded from a server following a request from the main device. The preferred channel is an IP channel. The pointer and parameters to configure the request are extracted from the interactive data of the transmitted stream or also obtained through the IP channel based on information extracted from the transmitted stream. The interactive parameters are in parallel buffered until the completion of the download.

3. Via Both Transmission and IP

According to a particular mode of the invention, the main interactive application is extracted from the transmitted stream and the secondary interactive application is directly obtained by the second device(s) via an IP channel. The main device passes the pointer and parameters, extracted from the interactive data, to the second device and the latter opens a point-to-point connection to download the content using the pointer as an address to the location where the interactive application is stored. Once completed, the second device sends an acknowledgment to the main device in order to inform it that the interactive experience can now take place.

In this embodiment, the request sent by the secondary device willnot only specify the address of the server, but will also contain a type of the secondary device. The server can host different versions of the same interactive experience depending of the software manager executed by the secondary device. An example characterizing the software manager can be the operating system of the secondary device, such as IOs or Android. The type can further contain a detailed description of the secondary device such as screen size, version of the operating system or communication capabilities with the main device. The request to the server specifies this type of operating system and the server selects the proper secondary interactive application suitable for that environment.

BRIEF DESCRIPTION OF THE FIGURES

The present invention will be better understood in view of the attached figures in which.

DETAILED DESCRIPTION

Figure 1:
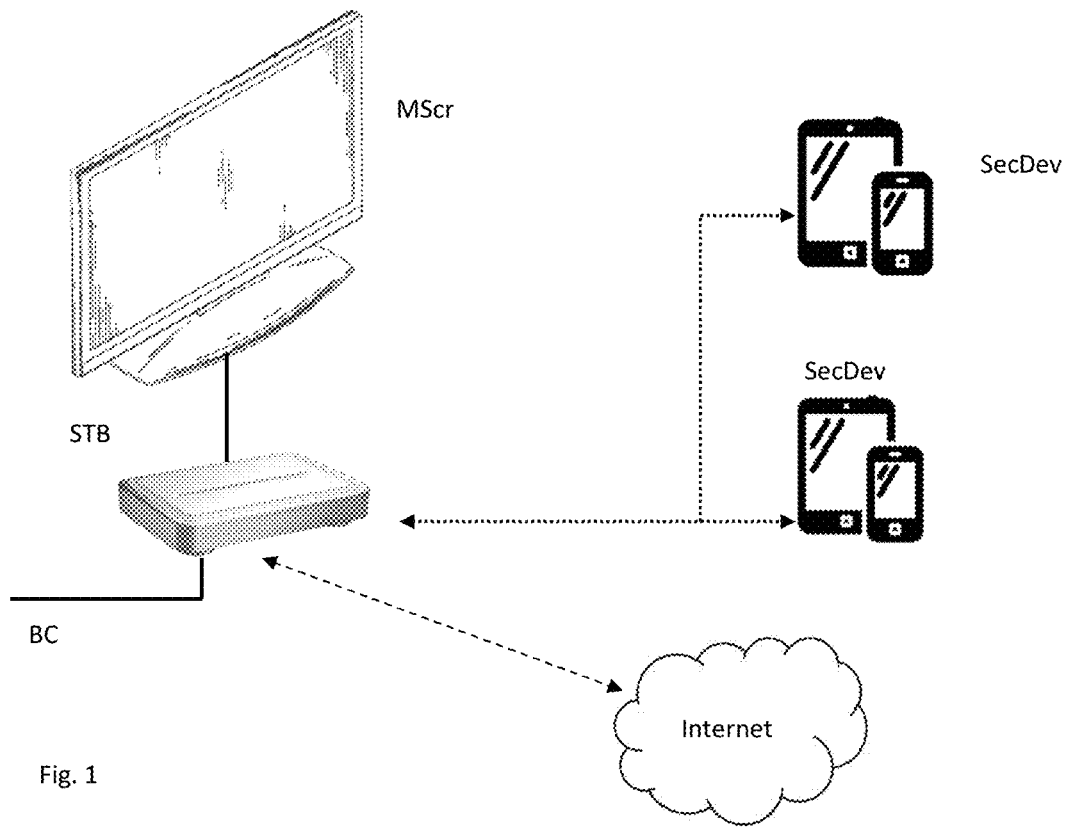
FIG. 1 describes an implementation of the system comprising a main device (STB) connected with several second screen device (SecDev) to interact with the main device in relation with an audio/video stream.

The main device (STB) is in charge of receiving the transmitted signal from an operator and rendering the signal on a screen (MScr). A transmitted signal (BC) can comprise, for example, one or several services, a service being associated with a television channel. In the case of a multiple services transmission, the transmitted signal comprises a PAT which stands for Program Association Table. It lists all services available in the transport stream. Each of the listed services is identified by a 16-bit value called service_number. Each of the services listed in PAT has an associated value of PID for its Program Map Table (PMT).

The PMT or Program Map Tables contain information about services. For each service, there is one PMT. While the MPEG-2 standard permits more than one PMT section to be transmitted on a single PID, most MPEG-2 "users" such as ATSC and SCTE require each PMT to be transmitted on a separate PID that is not used for any other packets. The PMTs provide information on each service present in the transport stream, including the service_number, and list the elementary streams that comprise the described MPEG-2 program. There are also locations for optional descriptors that describe the entire MPEG-2 program, as well as optional descriptors for each elementary stream. Each elementary stream is labeled with a stream type value. The elementary stream contains only one type of data such as audio, video, data, closed caption.

As far as the data type elementary stream is concerned, there can be more than one data elementary stream per service, for example one for the conditional access (EMM, ECM messages) and another one for the interactive experience. The packets of the interactive experience comprise a header describing the content of the packet. In the description of the packet, various information can be found such as a descriptor of the interactive experience, a category and technical data such as a version number, STB type etc. Once extracted, the interactive data are stored in a temporary memory.

The types of transmissions foreseen in the frame of the possible implementations of the invention include, e.g., traditional broadcast, broadcast over IP, multicast, unicast (e.g. for video on demand), and point-to-point.

The transmitted signal comprises at least audio/video data forming the main content and signaling data which comprises at least a pointer to the interactive data. The signaling data can further comprise an interactive experience description.

The STB can have a filter to react to all, none or only to particular type of signaling data. This may be executed pursuant to the category (part of the description) of the interactive experience set in the interactive parameters IPa. Additionally, the STB preferably should be able to sense the secondary devices (SecDev) connected to it and to check whether they are (or at least one is) able to run an exemplary interactive experience. In the negative event, the filter of the STB can be automatically set to not react to the signaling data.

In the case that interactive applications are part of the interactive data, the STB extracts the interactive applications from the transmitted stream and splits the main interactive application from the secondary interactive application. The main interactive application may be used to launch the interactive experience on the STB. After the launch, the STB detects the presence of the second devices (SecDev) and communicates the second interactive application to each second device. For that purpose, the STB comprises a detection module to keep track of the connected secondary devices with their respective addresses and configurations. A copy of this second interactive application may remain stored in the STB in case another second device is detected later. Once the interactive data are extracted from the transmitted stream, the main device detects the data for itself, e.g., by detecting a bit in the header of the data packets and loads the corresponding main interactive application into its memory. The secondary interactive application is sent to the secondary device via the wireless connection. In the same manner, the second interactive application is loaded into the second device's memory and executed.

In an embodiment in which all or part of the interactive application is hosted on a remote server and not on the transmitted stream, the STB extracts the pointer from the signaling data and uses this pointer as an address of the server to access the interactive data. The STB initiates a request to download the interactive application(s) due to the pointer. According to another embodiment, the signaling data contains only a signal to inform the user that an interactive experience is ongoing. This signal can contain a descriptor of the user's experience and can be interpreted by the main device. The STB can react to the detection of the signal in different manners, e.g., a banner can be displayed on the screen or a pop-up window, allowing the user to click to request the main and the secondary interactive applications from the remote server. The signal can contain a description identifying the interactive experience and can be displayed in the banner, and the user, while accessing to the remote server, enters the description into a request form. The server can then determine which main and secondary applications refer to this description. In the case of a interactive message (e.g., pop-up), the main device, while receiving the activation request from the user, initiates a link with the remote server and passes the description to the remote server.

Based on the received description, the remote server preferably selects the appropriate main and secondary applications and downloads them to the main device.

Figure 2:
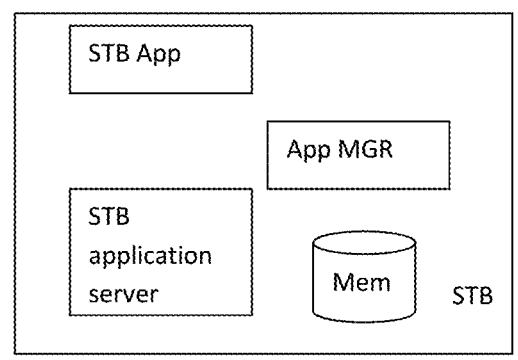
FIG. 2 illustrates an implementation of the modules within the main device.

The main device (STB) may receive the transmitted signal and filter one or more services requested by the user. In the case of multiple transmitted services, a first service can be displayed on the TV screen (MScr) and another one can be stored on a storage device (Mem). The decoder of the main device extracts the different elementary streams of the first service and determines if interactive data are present. In the positive event, these interactive data are extracted from the service and passed to an Application Manager (App MGR) located in the main device. As illustrated in FIG. 2, the STB may comprise an STB application server module which deals with the communication layer with the secondary devices. On top of the STB server, an Multi Device Application (Servlet) is able to run various specific applications designed for the STB. One of these applications is the Main interactive application (STB app) which will contribute to the user's experience.

A filter layer is preferably applied to the interactive data, in particular to the signal to enable or disable the interaction function or select only the category of interactive data predefined by the user. The interactive data comprises in the signaling data, a marker indicating that an interactive experience is available for the current audio/video transmission. The signaling data further comprises a descriptor of the interactive experience, which can be free text used to be displayed in a banner or a pop-up window. In addition to the free text, the signaling data can further comprise a category to inform the STB of the type of interactive experience. The signaling data can further comprise timing data, such as when the interactive experience has started and/or when the interactive experience will end.

The interactive data can comprise application parameters. Once retrieved, the interactive applications are ready to be executed by the main or the secondary device. These applications are executable code, preferably in an interpreted language such as Javascript code or Java byte code. This facilitates the portability of the code onto various devices.

The interactive data ID comprises interactive parameters IPa. According to an embodiment, these parameters can further comprise a section for the main device and a section for the secondary devices. The main interactive parameters are applied to the main interactive application to create a user's experience. The secondary parameters are applied to the secondary interactive application and initiate the interaction with the main device.

Figure 3:
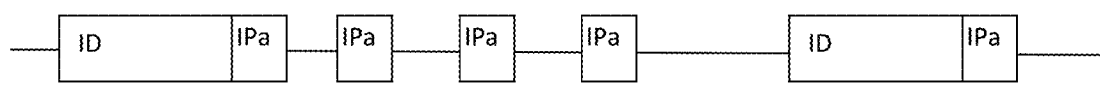
FIG. 3 illustrates an elementary stream of the interactive data.

In FIG. 3, an elementary stream containing the interactive data is illustrated. This example corresponds to the case in which the interactive applications (at least the main interactive application) are part of the interactive data. The Interactive data ID is repeated along the live event allowing a STB to enter into the interactive mode when tuning to this service at any time. These interactive parameters are used by the STB and transferred to the secondary device so that the interactive experience stays up-to-date. The interactive parameters IPa are sent more often (i.e., updated independently of the transmission of the interactive applications) and are changed according to the development of the event. For example, data concerning a soccer match may be constantly updated with the latest actions of the players. This is why the Interactive parameters in this example may change more often than in other examples.

Figure 4:
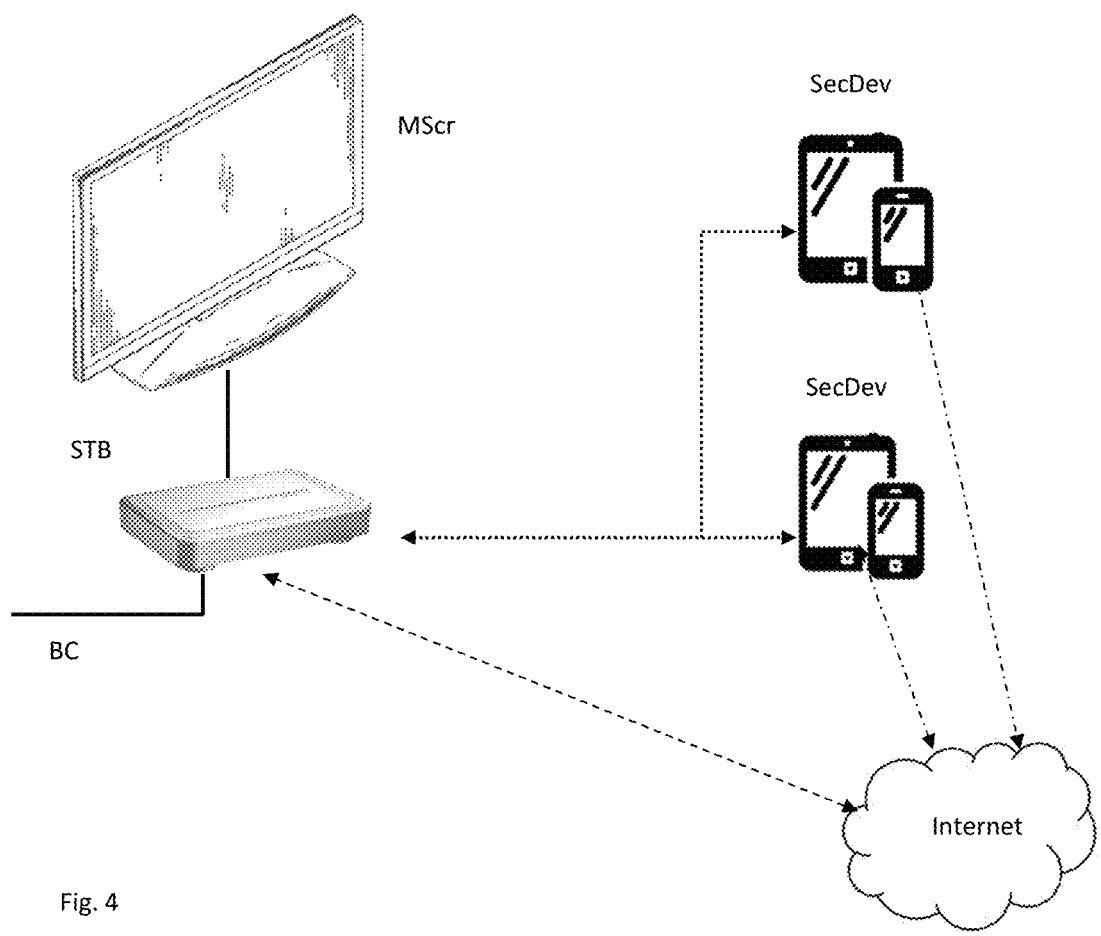
FIG. 4 illustrates an embodiment in which the secondary device is connected via IP to a server.

In FIG. 4, the secondary device SecDev has a connection with a server via Internet. This connection is used to download the secondary interactive application pursuant the parameters (as defined by the pointer) received from the main device. Once the main device has detected the signal in the transmitted stream and extracted the interactive data, part of the interactive data (i.e. the pointer) containing the indications allowing the secondary device to access the server are transmitted to the secondary device. The latter can then access the server using the pointer and optionally the description contained in the interactive data. The description can used to identify, by the server, which user's experience is desired by the secondary device and should be in line with the main interactive data obtained by the main device. Once the download is completed, the secondary device notifies the main device and the interactive experience can take place.

According to an embodiment, each secondary device obtains from the main device the pointer to request the server for obtaining the proper secondary interactive application. According to another embodiment, the secondary device, once the download of the secondary interactive application is completed, uploads the secondary interactive application into the main device. As a consequence, when another secondary device is detected by the main device or upon request from a secondary device, the main device can then transfer the secondary interactive application instead of the pointer of the server. This has the advantage that the server will be solicited only once for a plurality of secondary devices connected with a main device. The main device plays the role of a buffer storing the secondary interactive application for another secondary device. According to an example of embodiment, the main device, while receiving the signal indicating the end of the interactive experience, can flush its buffer thus freeing some memory space for future applications.

Examples of Embodiments

Several embodiments are discussed below. As with the description above, it will be understood that various parts of each example may be combined, mixed or matched with various parts of other examples while still remaining within the sense of the described embodiments.

Live Soccer Match Multi-Player Game

A possible implementation of this invention is a multi-player (multi-screen) game related to a live soccer match.

When the soccer match starts (or whenever the user tunes to the channel where the match is transmitted), along with the soccer match, interactive data are sent to the main device. Once extracted and loaded into the main and secondary device(s), the interactive application related to the soccer match starts on the main screen as well as on the second screen devices.

The game consists of having each viewer answering (on the second screen devices) a set a questions about the match, either general knowledge questions or betting on future events/actions in the match (e.g., goal). The interactive module on the secondary device proposes the question to a participant and collects the answer. Questions and answers are part of the parameters of the interactive data. Once the responses to the questions are entered, the secondary device transmits the answers to the main device. The interactive module of the main device collects the response from a plurality of secondary devices and can display the results on the main screen. Each secondary device is preferably associated with an identifier such as the name of the participant. The main interactive module can organize the result to display the name of each participant as well as the result, e.g. the number of successful answers per participant.

In addition, on his second screen device, each viewer can browse the list of players, browse the game highlights (can be picture/text and/or videos that can be watched on the second screen) and various other information related to this game without impacting the other viewers since it is done on his own screen. Updated data about the game continuously flow from audio/video provider to the main device and then from the main device to each second-screen device.

The transmitted stream should preferably contain several instances of the interactive data, repeated over time, in order to allow each STB to jump into the interactive experience when the user switches to the channel or switches on the STB. Additionally, the interactive parameters are frequently updated in order to provide additional questions or information related to the game during the match. The interactive parameters are then preferably encapsulated separately from the interactive applications and associated with a version number. When the main device detects a change of version number, the new interactive parameters are processed and transferred to the secondary devices and/or updated on the main device.

Once the game is finished, the application automatically terminates both on the main screen and on the second screens. In fact, it could be replaced by a new application related to the next TV program after the soccer match.

One advantage of this exemplary solution is to allow the scaling during a massively watched event. Since data are transmitted to the STB (or pulled via IP by the STB only), it allows an improved response time for the viewers.

Quiz

The scenario above could also be used for a quiz where several viewers in the home can compete against each other to answer questions on their second screen device. The results can be displayed on the main screen.

In order to prevent any hacking, the questions and answers data could be fed from the operator head-end to the STB and/or from the STB to the second screen only when they show up in the TV program.

The advantage of this solution is not only the scaling, moreover, is to allow multiple viewers in the home to join a game where there is little latency (as there is no need to go to a remote server) allowing a fine-grained synchronization with the TV program (e.g. for timeout to answer a quiz question).

Interactive Advertising During Super-Bowl or World Cup Soccer Match (or the Like)

Another use of this invention is for interactive advertising on the second screen.

A little before advertising starts, the interactive data would be sent to the STB.

The interactive data could include some AV content i.e., the "long version" of the advertising meant to be watched on the second screen device of the interested viewer. In that case, the interactive data being quite big, more time would need to be provisioned to push the interactive data to the STB.

On-Demand Application

The interactive data could also be launched on demand (rather than linked to a TV program and automatically launched when the TV program starts).

For instance, it could be the equivalent of a board game: The board would be displayed on the main TV screen and each participant would have a personal view on his second screen device (e.g., with set of cards not shared with others).

In this case, the interactive data could be sent (once or periodically or in sections) to the STB to be cached or stored persistently in the STB. Once the user decides to launch the application, the corresponding interactive data is retrieved and the main interactive application loaded into the STB. The secondary interactive application is sent to the secondary device(s). Once the STB and the secondary device have started the interactive applications, the game experience can take place. At the end of the game, the secondary devices do not keep the received interactive data and the memory is deleted from the interactive modules.

Benefit of the invention: There is no need to pre-install the application on the second device. It is only when the application is started on the main device that it auto starts on the second devices.

Possible Implementations

| Phase | Possible IP-based real implementation | Possible real broadcast-based implementation |
|---|---|---|
| 1. Indication that a new application shall start | Indication found by polling via IP from the STB to the operator head-end server or other content source | Indication can be received via a signal in the broadcast (e.g. DVB AIT table for the channel) |
| 2. Setup in STB: Interactive data downloaded to STB See "Setup in STB" phase section | Download via IP of the application from an operator head-end server, or other content source | Download from a carousel broadcast by the operator head-end server |

-continued

| Phase | Possible implementations | |
|---|---|---|
| | Possible IP-based real implementation | Possible real broadcast-based implementation |
| 3. Setup in $2^{nd}$ screen device: Sends signal to $2^{nd}$ screen to initiate the load of the $2^{nd}$ screen application from the STB | See "Setup in 2nd screen device" phase section | |
| 4. Communication between STB & second screen devices | See "Communication between STB & secondary devices" phase | |
| 5. Update of data in main screen app and second screen app (see "Data provisioning and update" phase section) | By IP | By broadcast |
| 6. Termination (see "Termination" phase section) | Indication to stop the app found by polling via IP from the STB to the operator head-end server, or other content source | Indication to stop the app received via a signal in the broadcast (e.g. AIT table for the channel) |

"Setup in STB" Phase

We will describe possible implementations for the initialization/setup of the interactive experience in the STB:
 (1) the STB comprises a main software comprising an application server. Once the data packets are extracted from the transmitted stream or from IP, the header of these packets are processed. In case that interactive data are detected, the main interactive application is launched and the rest of the interactive data packets are buffered. The secondary interactive application is extracted from the buffer and loaded on the STB application server by the main interactive application so that the second devices can later load the secondary interactive application served from the STB application server.
 (2) The main and secondary interactive applications are loaded directly on a STB application server, (i.e., the application is a server instance). Then the STB application server serves the applications BOTH to the STB application execution engine for display on the main screen and to the second screen devices.
 (3) The main interactive application can act itself as a server. This is not possible if using HTML/Javascript applications executed on standard web browser, however other languages such as Java/Android would allow such implementation.

"Setup in 2nd Screen Device" Phase

The way for the 2nd screen device to pair with the STB will be briefly described since in general the secondary interactive application of the secondary device would be loaded inside a real iOS/Android operating system (host controller) controlled by the Operator and already be in connection with the STB.

Overall, one of the following solutions can be used to start the secondary interactive application:
 (1) the STB forces the application to be loaded in the secondary device by communicating with the host controller.
 (2) the secondary device host controller polls the STB application server regularly to check if there an application to download
 (3) some User Interface the main screen will suggest to the viewer some action to be taken (e.g., start the host controller) to connect the secondary device to the STB and download the interactive data.

"Communication Between STB & Secondary Devices" Phase

For the dynamic communication between the main interactive application running on the STB and the secondary interactive applications, there are also 2 approaches:
 (1) The communication goes though the STB application server (i.e., both the STB main interactive application and the secondary interactive applications connect to the STB server (using a mechanism such as WebSocket) and the STB application server forwards the messages between them similarly to a chat server).
 (2) The communication goes directly from the main interactive application to secondary interactive application.

In case the application are written in HTML/Javascript and are running in standard browser, (1) would be the preferred solution.

"Data Provisioning and Update" Phase

One way to store the data related to the TV program (e.g., live soccer statistics, quiz question/answer list) is to use a database memory on the STB. An exemplary implementation may be found in WO2002/102030. Whenever a data update is received, the database would be updated accordingly.

Note that the data could also include related Audio/Video content pushed and stored to the STB. Effectively, rather than having the secondary application query directly the operator head-end for AV content, the request could go through the STB that would cache the Audio/Video content (eg replay of highlights), i.e., anticipating that multiple people in the home will view the same content and therefore reduce the load on the operator head-end server.

Based on design choices, the transport format used to send the data could be in a traditional format such as XML, JSON or in binary. One specific format would be to send them directly in the database format for faster setup.

"Termination" Phase

Once the STB finds that the interaction application experience shall be stopped, all interactive application instances both on STB and secondary devices shall stop. An instruction to stop the interactive applications can be extracted from the interactive data originating from the transmitted stream or from IP. Once extracted and detected by the application server of the STB, the main interactive application communicate with the second device applications to stop the application. The executable memory of the STB and the secondary devices is cleaned and the interactive components are deleted. The STB as well as the secondary devices can keep track of the data entered by the users. On the secondary device, that can be done by the operator host application for example.

It is to be noted that as used throughout the description, the expression "operator head-end" or "operator" are used to generally refer to a content service provider, exemplified by, but not limited to, traditional Pay-TV service providers such as entities selling cable or satellite television services. It will be understood that any content providing entities or several entities cooperating or providing services in a non-coordinate manner are also encompassed herein.

Another object of the present invention is a main reception device comprising wireless communication means with at least a secondary device, said main reception device being configured to receive a transmitted stream containing audio/video content and to display said content to a main viewing screen, the main device being configured to:
- receive a main stream comprising audio/video content and interactive data, said interactive data comprising at least a signal indicating availability of the ongoing interactive experience related to the audio/video content of the main stream,
- extract the interactive data from the main stream,
- obtain a main and a secondary interactive application pursuant to the interactive data,
- load the main interactive application into a software module of the main reception device,
- transfer the secondary interactive application toward the secondary device view the wireless communication means,
- obtain interactive parameters which are part of the interactive experience,
- transfer all or part of the interactive parameters to the secondary device,
- receive by the main interactive application of the main reception device via the wireless communication means, results of user's interactions made on the secondary device,
- process the received user's interactions by the main interactive application to produce a result, and
- output the result toward the main viewing screen together with the audio/video content.

Another object of the present invention is a secondary device comprising wireless communication means with a main device, said secondary device being configured to:
- receive from the main device, an address of a secondary interactive application being part of an interactive experience with the main device, said address pointing to a server hosting the main and the secondary interactive applications
- download the secondary interactive application from the server pursuant the address,
- execute the secondary interactive application,
- collect user's interactions made during execution of the secondary interactive application, and
- transfer the user's interactions to the main device via the wireless communication means.

What is claimed is:

1. A method for providing interactivity between devices, the method comprising:
   receiving, by a main device in communication with a secondary device, a stream comprising media content and interactive data including interactive parameters, the interactive data facilitating an ongoing interactive experience associated with the media content for one or more secondary devices;
   extracting, by the main device, the interactive data from the stream;
   identifying, from the interactive data, a portion of the interactive data for the secondary device, the portion of the interactive data enabling the secondary device to access an interactive application at a server to provide the ongoing interactive experience;
   facilitating, by the main device, the portion of the interactive data to be sent to the secondary device;
   receiving, by the main device, updated interactive parameters for the ongoing interactive experience based on a change in an event associated with the ongoing interactive experience during the stream;
   filtering the updated interactive parameters based on one or more characteristics of the ongoing interactive experience associated with a preference of a user and one or more characteristics of the updated interactive parameters to determine updated secondary interactive parameters for the ongoing interactive experience and associated with the secondary device, wherein the updated secondary interactive parameters for the ongoing interactive experience include a subset of interactive parameters from the updated interactive parameters; and
   transferring, from the main device to the secondary device based on the filtering, the updated secondary interactive parameters to cause the ongoing interactive experience to be updated, the updated secondary interactive parameters enabling the secondary device to request information associated with the ongoing interactive experience from the server.

2. The method of claim 1, wherein the portion of the interactive data further includes a description identifying the ongoing interactive experience, and wherein the portion of the interactive data enables the secondary device to access the interactive application at the server using the description identifying the ongoing interactive experience.

3. The method of claim 1, wherein the interactive application is a first interactive application, and wherein the method further comprises:
   executing, by the main device, a second interactive application for the ongoing interactive experience.

4. The method of claim 1, wherein the interactive application is a first interactive application, and wherein the method further comprises:
   identifying, from the interactive data, a portion of the interactive data for the main device, the portion of the interactive data for the main device enabling access to the server for a second interactive application to provide the ongoing interactive experience; and
   accessing, by the main device, the second interactive application from the server to provide the ongoing interactive experience.

5. The method of claim 1, further comprising:
   obtaining, by the main device, one or more parameters associated with one or more interactions made on the secondary device during execution of the interactive application;
   determining, by the main device, one or more results associated with the ongoing interactive experience using the one or more parameters associated with the one or more interactions; and
   causing, by the main device, the one or more results to be displayed.

6. The method of claim 1, wherein the interactive data includes one or more main interactive parameters and one or more secondary interactive parameters, the one or more main interactive parameters being used by the main device to create a user experience for the ongoing interactive experience, and the one or more secondary interactive parameters being used to initiate an interaction between the main device and the secondary device using the interactive application.

7. The method of claim 6, further comprising:
identifying, by the main device, the one or more main interactive parameters and the one or more secondary interactive parameters from the interactive data; and
facilitating, from the main device, the one or more secondary interactive parameters to be sent to the secondary device.

8. The method of claim 1, wherein the interactive data includes a category associated with the ongoing interactive experience, and wherein the method further comprises:
filtering the stream to select the interactive data based on the category.

9. The method of claim 1, wherein the interactive application is identified based on a type of the secondary device.

10. The method of claim 1, wherein the media content is related to a live event, and wherein the ongoing interactive experience is updated to reflect a change in the live event.

11. The method of claim 1, wherein the media content is related to a live event, and wherein the ongoing interactive experience is updated to include one or more questions related to the live event.

12. A main device in communication with a secondary device, comprising:
one or more processors; and
a memory accessible to the one or more processors and storing instructions which, upon execution by the one or more processors, cause the one or more processors to perform operations comprising:
receiving a stream comprising media content and interactive data including interactive parameters, the interactive data facilitating an ongoing interactive experience associated with the media content for one or more secondary devices;
extracting the interactive data from the stream;
identifying, from the interactive data, a portion of the interactive data for the secondary device, the portion of the interactive data enabling the secondary device to access an interactive application at a server to provide the ongoing interactive experience;
facilitating the portion of the interactive data to be sent to the secondary device;
receiving updated interactive parameters for the ongoing interactive experience based on a change in an event associated with the ongoing interactive experience during the stream;
filtering the updated interactive parameters based on one or more characteristics of the ongoing interactive experience associated with a preference of a user and one or more characteristics of the updated interactive parameters to determine updated secondary interactive parameters for the ongoing interactive experience and associated with the secondary device, wherein the updated secondary interactive parameters for the ongoing interactive experience include a subset of interactive parameters from the updated interactive parameters; and
transferring, to the secondary device based on the filtering, the updated secondary interactive parameters to cause the ongoing interactive experience to be updated, the updated secondary interactive parameters enabling the secondary device to request information associated with the ongoing interactive experience from the server.

13. The main device of claim 12, wherein the portion of the interactive data further includes a description identifying the ongoing interactive experience, and wherein the portion of the interactive data enables the secondary device to access the interactive application at the server using the description identifying the ongoing interactive experience.

14. The main device of claim 12, wherein the interactive application is a first interactive application, and the memory storing instructions which, upon execution by the one or more processors, cause the one or more processors to perform operations comprising:
executing a second interactive application for the ongoing interactive experience.

15. The main device of claim 12, wherein the interactive application is a first interactive application, and the memory storing instructions which, upon execution by the one or more processors, cause the one or more processors to perform operations comprising:
identifying, from the interactive data, a portion of the interactive data for the main device, the portion of the interactive data for the main device enabling access to the server for a second interactive application to provide the ongoing interactive experience; and
accessing the second interactive application from the server to provide the ongoing interactive experience.

16. The main device of claim 12, the memory storing instructions which, upon execution by the one or more processors, cause the one or more processors to perform operations comprising:
obtaining one or more parameters associated with one or more interactions made on the secondary device during execution of the interactive application;
determining one or more results associated with the ongoing interactive experience using the one or more parameters associated with the one or more interactions; and
causing the one or more results to be displayed.

17. The main device of claim 12, wherein the interactive data includes one or more main interactive parameters and one or more secondary interactive parameters, the one or more main interactive parameters being used by the main device to create a user experience for the ongoing interactive experience, and the one or more secondary interactive parameters being used to initiate an interaction between the main device and the secondary device using the interactive application.

18. The main device of claim 17, the memory storing instructions which, upon execution by the one or more processors, cause the one or more processors to perform operations comprising:
identifying the one or more main interactive parameters and the one or more secondary interactive parameters from the interactive data; and
facilitating the one or more secondary interactive parameters to be sent to the secondary device.

19. The main device of claim 12, wherein the interactive data includes a category associated with the ongoing interactive experience, and the memory storing instructions which, upon execution by the one or more processors, cause the one or more processors to perform operations comprising:
   filtering the stream to select the interactive data based on the category.

20. A non-transitory computer-readable medium of a main device having stored thereon instructions that, when executed by one or more processors, cause the one or more processors to:
   receive a stream comprising media content and interactive data including interactive parameters, the interactive data facilitating an ongoing interactive experience associated with the media content for one or more secondary devices;
   extract the interactive data from the stream;
   identify, from the interactive data, a portion of the interactive data for a secondary device, the portion of the interactive data enabling the secondary device to access an interactive application at a server to provide the ongoing interactive experience;
   facilitate the portion of the interactive data to be sent to the secondary device;
   receiving updated interactive parameters for the ongoing interactive experience based on a change in an event associated with the ongoing interactive experience during the stream;
   filter the updated interactive parameters based on one or more characteristics of the ongoing interactive experience associated with a preference of a user and one or more characteristics of the updated interactive parameters to determine updated secondary interactive parameters for the ongoing interactive experience and associated with the secondary device, wherein the updated secondary interactive parameters for the ongoing interactive experience include a subset of interactive parameters from the updated interactive parameters; and
   transfer, to the secondary device based on the filtering, the updated secondary interactive parameters to cause the ongoing interactive experience to be updated, the updated secondary interactive parameters enabling the secondary device to request information associated with the ongoing interactive experience from the server.

* * * * *